US012560953B2

(12) United States Patent (10) Patent No.: US 12,560,953 B2
Sawa (45) Date of Patent: Feb. 24, 2026

(54) TOILET DEVICE

(71) Applicant: TOTO LTD., Kitakyushu (JP)

(72) Inventor: Shonosuke Sawa, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 0 days.

(21) Appl. No.: 19/014,984

(22) Filed: Jan. 9, 2025

(65) Prior Publication Data

US 2025/0231573 A1    Jul. 17, 2025

(51) Int. Cl.
*G05D 23/19* (2006.01)
*E03D 9/08* (2006.01)

(52) U.S. Cl.
CPC ........... *G05D 23/1917* (2013.01); *E03D 9/08* (2013.01)

(58) Field of Classification Search
CPC ....................................................... E03D 9/08
See application file for complete search history.

(56) References Cited

U.S. PATENT DOCUMENTS

| | | | |
|---|---|---|---|
| 7,191,473 B2 * | 3/2007 | Matsumoto | E03D 9/08 4/420.4 |
| 2018/0002912 A1 * | 1/2018 | Yaoka | B05B 15/70 |

FOREIGN PATENT DOCUMENTS

| | | |
|---|---|---|
| JP | 2003-253735 A | 9/2003 |
| JP | 2004-263423 A | 9/2004 |
| JP | 2017-115298 A | 6/2017 |
| JP | 2023-118194 A | 8/2023 |
| JP | 2023-118195 A | 8/2023 |
| JP | 2023-120881 A | 8/2023 |

OTHER PUBLICATIONS

Decision to Grant a Patent for Japanese Patent Application No. 2024-003472 dated Sep. 3, 2025.

* cited by examiner

*Primary Examiner* — Christine J Skubinna
(74) *Attorney, Agent, or Firm* — McDonald Hopkins LLC

(57) ABSTRACT

A toilet device includes a heat exchanger, an on-off valve, a temperature sensor, and a controller. The controller is configured to perform a determination control, of driving the heat exchanger in a state in which the on-off valve is open, and calculating a change amount of a detected temperature while driving the heat exchanger, stopping the driving of the heat exchanger in the case where the change amount does not reach or exceed a first value within a first period from when the driving of the heat exchanger started, and calculating a drop amount of the detected temperature while the driving of the heat exchanger is stopped, and determining the driving of the heat exchanger to be allowable in the case where the drop amount reaches or exceeds a second value within a second period from when the driving of the heat exchanger stopped.

5 Claims, 4 Drawing Sheets

2

16

10

20

12

14

4a

4

TOILET DEVICE

CROSS-REFERENCE TO RELATED APPLICATIONS

This application is based upon and claims the benefit of priority from Japanese Patent Application No. 2024-003472, filed on Jan. 12, 2024; the entire contents of which are incorporated herein by reference.

FIELD

Embodiments described herein relate generally to a toilet device.

BACKGROUND

Conventional toilet devices may include instantaneous heat exchangers. Toilet devices perform a warm-water wash operation in which wash water warmed by a heat exchanger is discharged toward a human body private part such as a bottom or the like. There is a risk that excessive heating may occur when the heat exchanger is driven when there is no water or flow of water inside the heat exchanger.

For example, water may not flow into the heat exchanger due to a discrepancy, even when an on-off valve that opens and closes the flow channel of the water flowing through the heat exchanger is open. Empty-heating may occur in which the heat exchanger is driven in a state in which no water flows into the heat exchanger.

DETAILED DESCRIPTION

Figure 1:
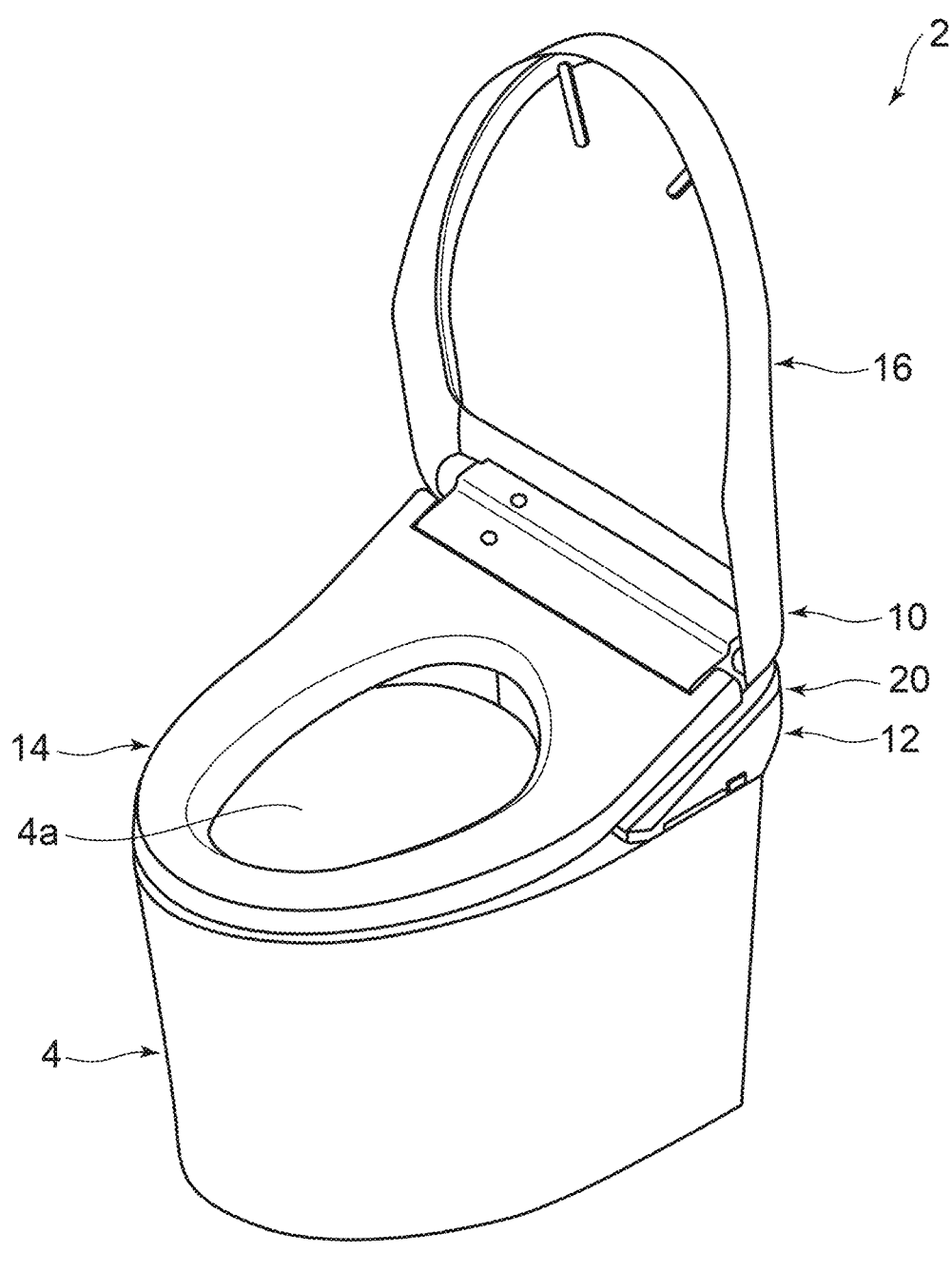
FIG. 1 is a perspective view illustrating a toilet device and a sanitary washing device according to an embodiment.

A first aspect is a toilet device including a heat exchanger, an on-off valve, a temperature sensor disposed downstream of the heat exchanger, and a controller; the heat exchanger is an instantaneous type; the on-off valve is configured to open and close a flow channel of water flowing in the heat exchanger; the controller is configured to acquire a detected temperature that is detected by the temperature sensor, and control the heat exchanger; the controller is configured to perform a determination control of driving the heat exchanger in a state in which the on-off valve is open, and calculating a change amount of the detected temperature while driving the heat exchanger, stopping the driving of the heat exchanger in the case where the change amount does not reach or exceed a first value within a first period from when the driving of the heat exchanger started, and calculating a drop amount of the detected temperature while the driving of the heat exchanger is stopped, and determining the driving of the heat exchanger to be allowable in the case where the drop amount reaches or exceeds a second value within a second period from when the driving of the heat exchanger stopped.

According to the toilet device, the heat exchanger can be more appropriately driven by the driving being based on the temperature detected by the temperature sensor disposed downstream of the heat exchanger. For example, the driving of the heat exchanger can be determined to be allowable when there is water or a flow of water inside the heat exchanger. By calculating the drop amount of the detected temperature while the driving of the heat exchanger is stopped, the driving of the heat exchanger can be determined to be allowable when, for example, the temperature of the water flowing into the heat exchanger has decreased.

A second aspect is the toilet device of the first aspect, wherein the second value is not more than the first value.

According to the toilet device, by setting the second value to be not more than the first value, it is easier to detect that the temperature of the water flowing into the heat exchanger has decreased.

A third aspect is the toilet device of the first aspect, further including a toilet seat, a seating detection sensor configured to detect a seating of a user on the toilet seat, and a nozzle configured to discharge water discharged from the heat exchanger; and the controller starts the determination control and sets the nozzle and the heat exchanger to be able to pass water in the case where the seating of the user is detected by the seating detection sensor.

According to the toilet device, in the case where there is a flow of water inside the heat exchanger in the determination control, the determination control and a water dump can be performed in parallel when the user is seated. As a result, for example, water can be promptly discharged from the nozzle in the warm-water wash operation; and the ease of use can be further improved.

A fourth aspect is the toilet device of the first aspect, further including a nozzle configured to discharge water discharged from the heat exchanger; and in the case where the drop amount does not reach or exceed the second value within the second period from when the driving of the heat exchanger stopped in the determination control, the controller drives the nozzle when receiving an instruction to cause the nozzle to discharge water.

According to the toilet device, the driving of the nozzle can be used to notify the user of a problem with the supply of water.

A fifth aspect is the toilet device of the first aspect, further including a nozzle configured to discharge water discharged from the heat exchanger; the controller is configured to perform a warm-water wash control of causing the nozzle to discharge, toward a private part of a user, water warmed by the heat exchanger by driving the heat exchanger with a first output; in the determination control, the controller drives the heat exchanger with a second output; and the second output is less than the first output.

According to the toilet device, by reducing the output of the heat exchanger in the determination control, damage to the heat exchanger due to empty-heating during the determination control can be suppressed, even when there is no water inside the heat exchanger.

Exemplary embodiments will now be described with reference to the drawings. Similar components in the drawings are marked with like reference numerals; and a detailed description is omitted as appropriate.

FIG. 1 is a perspective view illustrating a toilet device and a sanitary washing device according to an embodiment.

As illustrated in FIG. 1, the toilet device 2 includes a western-style sit-down toilet 4 (called simply the "toilet" for convenience in the following description) and the sanitary washing device 10. The sanitary washing device 10 is mounted on the toilet 4. The sanitary washing device 10 may be mounted as one piece with the toilet 4, or may be detachably mounted to the toilet 4.

The sanitary washing device 10 includes a main part 12, a toilet seat 14, and a toilet lid 16. The toilet lid 16 is provided as necessary in the sanitary washing device 10 and is omissible. The toilet seat 14 and the toilet lid 16 are pivotally supported to be rotatable with respect to the main part 12.

The toilet 4 includes a bowl 4a. The bowl 4a has a concave shape that is concave downward. The toilet 4 receives, in the bowl 4a, excrement such as urine, feces, and the like of a user.

The main part 12 of the sanitary washing device 10 is mounted on the part of the toilet 4 behind the bowl 4a. The main part 12 includes a casing 20. The toilet seat 14 and the toilet lid 16 are rotatably supported by the casing 20.

Figure 2:
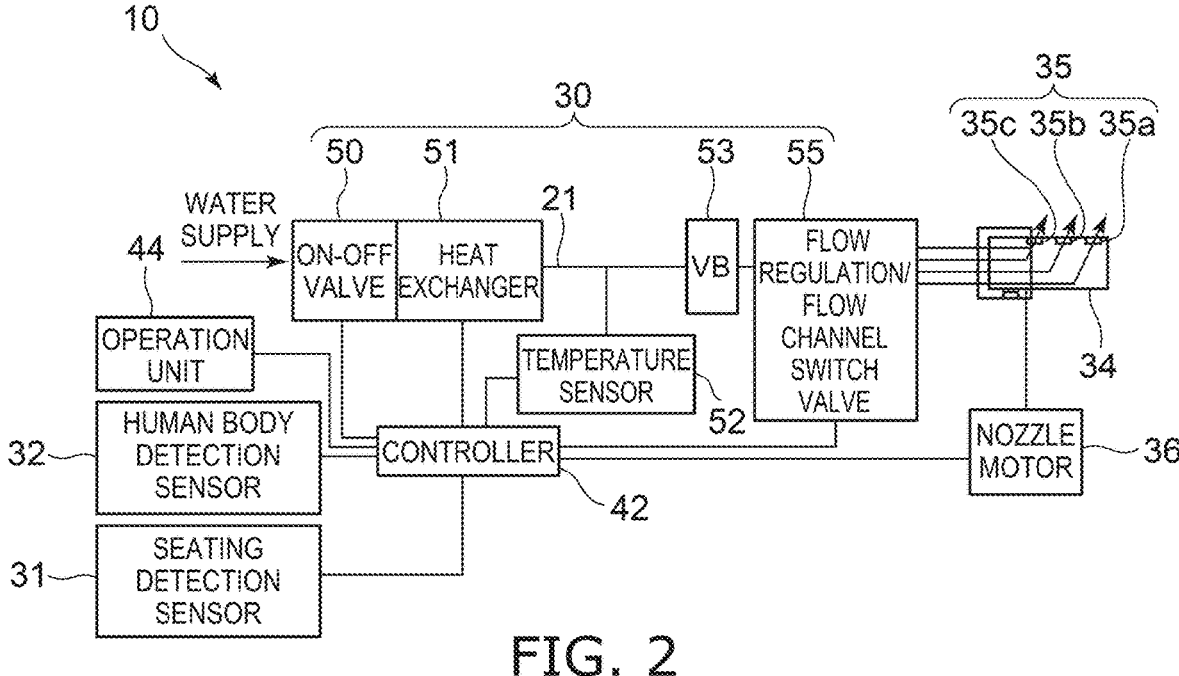
FIG. 2 is a block diagram illustrating relevant components of the sanitary washing device according to the embodiment.

FIG. 2 is a block diagram illustrating relevant components of the sanitary washing device according to the embodiment.

As illustrated in FIG. 2, the sanitary washing device 10 includes a wash water supply part 30, a seating detection sensor 31, a human body detection sensor 32, a nozzle 34, and a controller 42.

The seating detection sensor 31 can detect the user seated on the toilet seat 14 and/or a human body present above the toilet seat 14 directly before the user is seated on the toilet seat 14. The seating detection sensor 31 may detect not only the user seated on the toilet seat 14, but also the user present above the toilet seat 14. For example, an infrared transmitting-and-receiving distance sensor can be used as such a seating detection sensor 31. The seating detection sensor 31 may be a switch that is switched on and off by the load when the user is seated. The seating detection sensor 31 responds to the detection of the seating of the user by outputting, to the controller 42, a signal indicating the detection of the seating.

The human body detection sensor 32 is, for example, a pyroelectric sensor that utilizes an infrared signal, and detects the person entering the room (the toilet room) in which the toilet device 2 is installed. The human body detection sensor 32 is connected to the controller 42. The human body detection sensor 32 inputs the detection result to the controller 42. The human body detection sensor 32 may be, for example, a microwave sensor such as a doppler sensor, etc. The human body detection sensor 32 may be configured to detect the user before entering the toilet room.

The wash water supply part 30 includes, for example, an on-off valve 50, a heat exchanger 51, and a temperature sensor 52. The wash water supply part 30 may further include a vacuum breaker (VB) 53 and a flow regulation/flow channel switch valve 55 (a flow path switching part).

The on-off valve 50 is, for example, an openable and closable electromagnetic valve. The on-off valve 50 switches between the water supply and shutoff of wash water supplied from a water supply source. The on-off valve 50 is a water supply valve that opens and closes a flow channel 21 of the water flowing in the heat exchanger 51 and controls the supply of the water to the heat exchanger 51. In other words, by opening the on-off valve 50, the flow channel 21 of the water flowing in the heat exchanger 51 is opened, and water is supplied to the heat exchanger 51. By closing the on-off valve 50, the flow channel 21 is closed, and the supply of the water to the heat exchanger 51 is stopped.

After the on-off valve 50 is switched from the open state to the closed state, there are cases where water remains in the heat exchanger 51 and/or in parts of the flow channel 21 downstream of the heat exchanger 51. When the on-off valve

50 is switched to the closed state, water drainage may be performed to discharge the water remaining downstream of the on-off valve 50. In other words, when the on-off valve 50 is closed, water may or may not be inside the heat exchanger 51 and/or inside the flow channel downstream of the heat exchanger 51.

For example, the heat exchanger 51 is disposed downstream of the on-off valve 50. The heat exchanger 51 is, for example, an instant heating-type (instantaneous-type) heat exchanger that uses a ceramic heater, etc. The instantaneous heat exchanger produces warm water by heating water while the water flows through the interior. In the instantaneous heat exchanger, water that flows in a flow channel around a heating element (a heater) is heated by the heating element emitting heat. The heat exchanger 51 uses a heater to heat and raise the temperature of the wash water supplied from the water supply source to, for example, a specified temperature. The heat exchanger 51 converts the wash water supplied from the water supply source into warm water of the set temperature. In this specification hereinbelow, the scope of "water" includes water (cold water) supplied from the water supply source and warm water warmed by the heat exchanger 51.

For example, the vacuum breaker 53 is disposed downstream of the heat exchanger 51. When there is no water flowing in the flow channel, the vacuum breaker 53 promotes water drainage of the parts downstream of the vacuum breaker 53 by drawing air into the flow channel. For example, the vacuum breaker 53 promotes water drainage of the nozzle 34.

The water that passes through the heat exchanger 51 is fed toward the nozzle 34. The nozzle 34 includes a water discharger 35. The water discharger 35 includes, for example, multiple water discharge holes 35a, 35b, and 35c. The water that is fed toward the nozzle 34 is discharged upward from a water discharge hole of the water discharger 35. The water that is discharged from the water discharger 35 is used for a private part wash of the user seated on the toilet seat 14, etc.

The flow regulation/flow channel switch valve 55 is disposed between the vacuum breaker 53 and the nozzle 34. The flow regulation/flow channel switch valve 55 switches the destination of the water supplied from upstream to one of the water discharge holes. The flow regulation/flow channel switch valve 55 also modifies the water discharge rate of the water discharged from each water discharge hole.

The temperature sensor 52 is disposed downstream of the heat exchanger 51. The temperature sensor 52 is positioned upstream of the vacuum breaker 53 and the flow regulation/flow channel switch valve 55. The temperature sensor 52 detects the temperature of the fluid (water or air) inside the part of the flow channel 21 downstream of the heat exchanger 51. For example, the temperature sensor 52 detects the temperature of the fluid that is warmed by the heat exchanger 51 and discharged from the heat exchanger 51. The temperature sensor 52 detects the temperature of the fluid flowing from the heat exchanger 51 toward the flow regulation/flow channel switch valve 55 and the nozzle 34. The temperature sensor 52 is, for example, an outgoing water temperature sensor that detects the temperature of water immediately after the water is discharged from the heat exchanger 51. The temperature sensor 52 can include, for example, a thermistor.

The nozzle 34 may include a nozzle motor 36. The nozzle motor 36 drives the nozzle 34. The nozzle 34 can advance into the bowl 4a of the toilet 4 and retreat into the casing 20 by receiving the drive force from the nozzle motor 36.

The controller 42 controls the operations of the wash water supply part 30, the human body detection sensor 32, and the nozzle 34. For example, the controller 42 controls the operations of the components according to operation instructions input from an operation unit 44. The controller 42 can include, for example, a control circuit (a microcomputer, etc.) that includes a CPU, etc. The operation unit 44 may be a so-called remote control. The operation unit 44 may be disposed in the main part 12, or may be disposed separately from the main part 12. Communication between the controller 42 and the operation unit 44 may be wired or wireless.

The controller 42 controls the operations of the components (the on-off valve 50, the heat exchanger 51, the flow regulation/flow channel switch valve 55, and the nozzle motor 36) of the wash water supply part 30 by transmitting command signals to the components of the wash water supply part 30. For example, the controller 42 controls the supply of the wash water by controlling the on-off valve 50. For example, the controller 42 causes the nozzle 34 to advance and retreat by controlling the nozzle motor 36.

The controller 42 also can control the driving of the heat exchanger 51. Specifically, the controller 42 controls the supply of the drive power to the heat exchanger 51 for heat generation. As a result, the heater of the heat exchanger 51 is provided with a current and generates heat.

The controller 42 is connected with the temperature sensor 52 and acquires the detected temperature (the detection result) detected by the temperature sensor 52. The temperature sensor 52 detects the temperature every prescribed period (e.g., about every 50 to 100 milliseconds) and outputs the detection result to the controller 42. The controller 42 acquires the detected temperature that is detected every prescribed period. That is, the controller 42 can acquire the detected temperature that changes moment to moment. The controller 42 controls the heat exchanger 51 based on the detected temperature that is detected by the temperature sensor 52.

For example, the user inputs a warm-water wash operation to the operation unit 44 while seated on the toilet seat to cause the toilet device to perform the warm-water wash operation. The controller 42 receives a signal from the operation unit 44 instructing the warm-water wash control to be performed. The warm-water wash control opens the on-off valve 50, drives the heat exchanger 51, and causes warm water heated by the heat exchanger 51 to be discharged from the nozzle 34. The warm-water wash control also controls the flow regulation/flow channel switch valve 55 to switch the flow rate and/or flow channel of the water to be discharged, and drives the nozzle motor 36 to cause the nozzle 34 to advance into the bowl 4a. Thus, the warm-water wash operation is performed in which warm water is discharged from the water discharge hole of the water discharger 35 toward the user while the nozzle 34 is advanced into the bowl 4a. In the warm-water wash control, for example, the controller 42 drives the heat exchanger 51 with a first output (e.g., 1,200 watts).

For example, when the user is seated on the toilet seat 14, the seating detection sensor 31 detects the seating of the user. The controller 42 acquires, from the seating detection sensor 31, a detection result indicating the seating of the user. In such a case, the controller 42 may perform a warm water preparation control. The warm water preparation control drives the heat exchanger 51 with the on-off valve 50 in the open state, and controls the flow regulation/flow channel switch valve 55 so that the nozzle 34 is able to receive water from the heat exchanger 51. As a result, the warm water that is heated by the heat exchanger 51 flows inside the parts downstream of the heat exchanger 51 and/or the nozzle 34. That is, for example, the water (e.g., the cold water) that remains inside the parts downstream of the heat exchanger 51 and/or the nozzle 34 is discharged into the bowl 4a (water dump) and replaced with the warm water heated by the heat exchanger 51. In the warm water preparation control, the flow regulation/flow channel switch valve 55 is controlled so that the nozzle 34 does not discharge water toward the user. Thus, a warm water preparation operation is performed in which the heat exchanger 51 and the nozzle 34 are set to be able to pass water; the water inside the flow channel is dumped; and warm water is introduced to the flow channel (e.g., the residual water is replaced with warm water). The warm water preparation operation prevents cold water from being discharged toward the user in the warm-water wash operation.

Although the detection of the seating of the user by the seating detection sensor 31 is used as the trigger of the warm water preparation operation in the example, the trigger of the warm water preparation operation may be any signal such that the warm water preparation operation can be performed before the warm-water wash operation. For example, the warm water preparation operation may be triggered by the detection of the user by the human body detection sensor 32.

Figure 3:
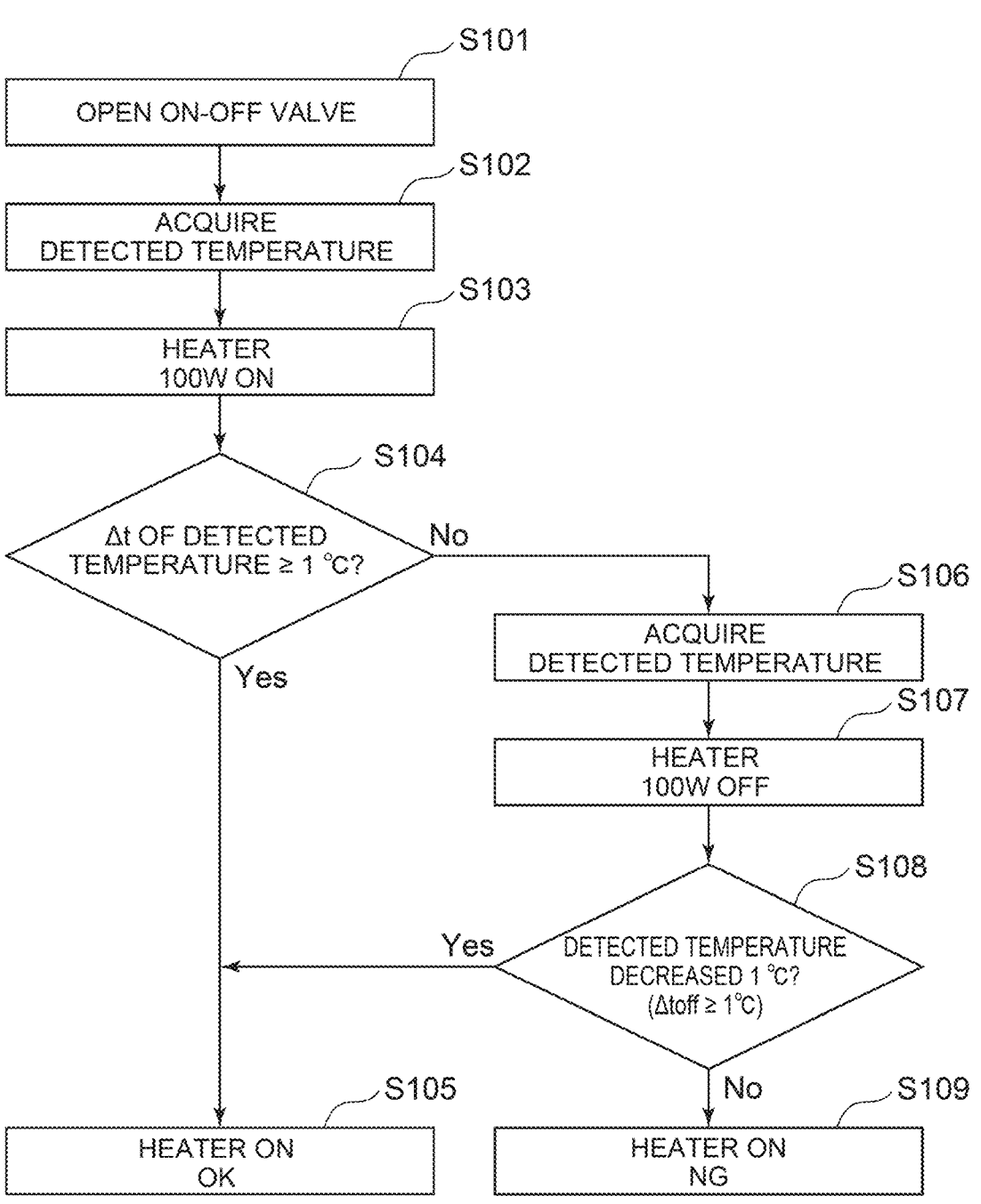
FIG. 3 is a flowchart illustrating operations of the toilet device according to the embodiment.

FIG. 3 is a flowchart illustrating operations of the toilet device according to the embodiment.

For example, the controller 42 performs the determination control illustrated in FIG. 3 by driving the heat exchanger. The determination control determines the enablement (the permission or prohibition) of the driving of the heat exchanger 51 after the determination control. For example, the determination control detects the presence of water or a flow of water inside the heat exchanger 51, determines that the driving of the heat exchanger 51 is allowable when there is water or a flow of water, and determines that the driving of the heat exchanger 51 is not allowable when there is no water or flow of water.

Figures 4A, 4B, 4C, 4D, 4E:
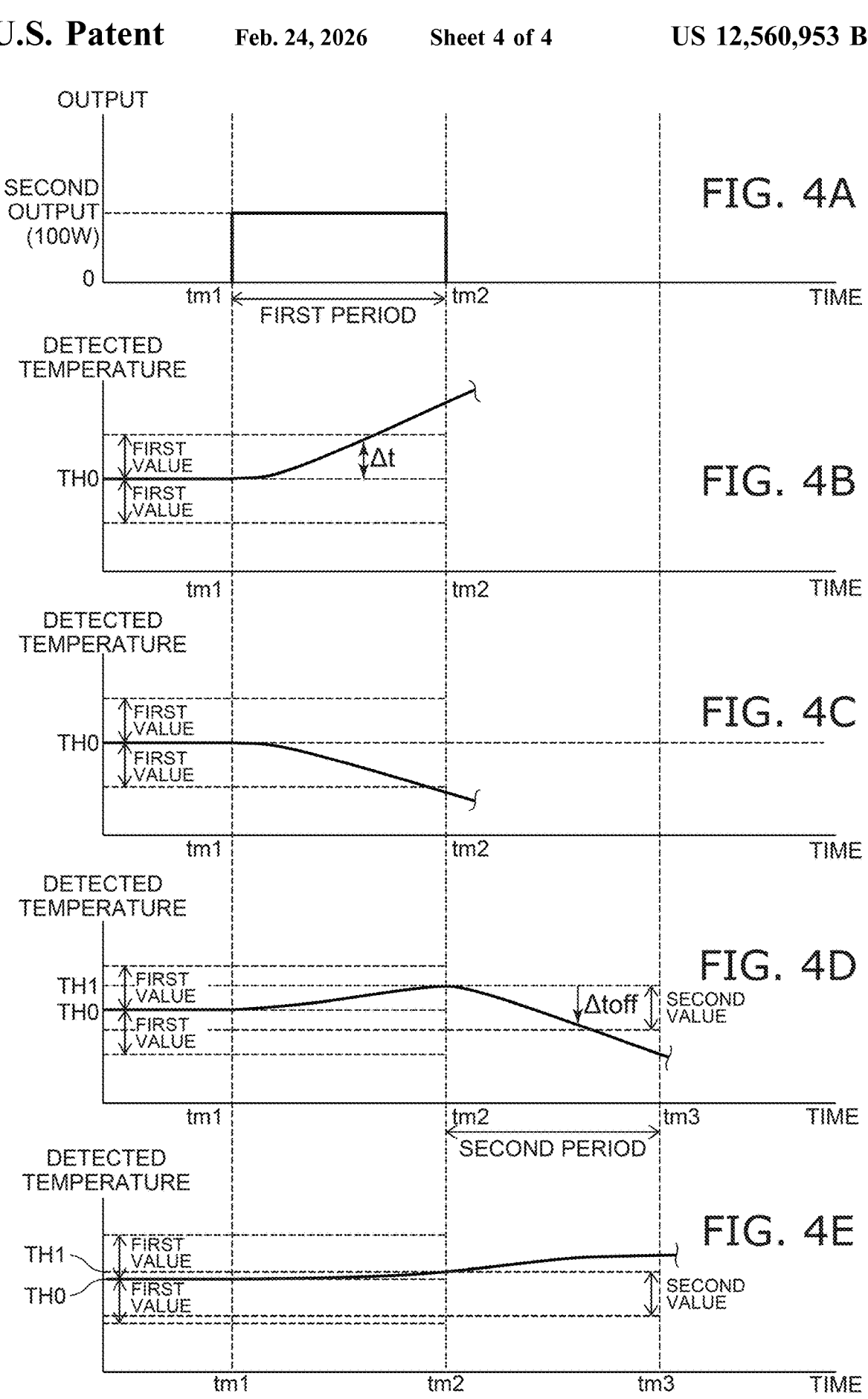
FIG. 4A is a graph illustrating an output of the heat exchanger during the determination control.
FIGS. 4B to 4E are graphs illustrating the detected temperature of the temperature sensor during the determination control.

FIG. 4A is a graph illustrating an output of the heat exchanger during the determination control; and FIGS. 4B to 4E are graphs illustrating the detected temperature of the temperature sensor during the determination control. In FIGS. 4A to 4E, the horizontal axis is time. Cases are considered where the change of the detected temperature is, for example, such as those of FIGS. 4B to 4E. These graphs are for a schematic or conceptual description, and are not necessarily the same as the actual values.

For example, as illustrated in FIG. 3, the controller 42 opens the on-off valve 50 (step S101). The controller 42 acquires the detected temperature that is detected by the temperature sensor 52 (step S102). The controller 42 starts a drive control that drives the heat exchanger 51 (step S103). As a result, the heat exchanger 51 is switched to the on-state and generates heat.

The controller 42 drives the heat exchanger 51 with a second output (in the example, 100 watts) for a maximum of a first period from when the driving of the heat exchanger 51 started in step S103. For example, as illustrated in FIG. 4A, the driving of the heat exchanger 51 with the second output starts at a time tm1. For example, the heat exchanger 51 is driven until a time tm2, which is at the first period from the time tm1.

After step S103 as illustrated in FIG. 3, the controller 42 calculates the change amount ($\Delta t$) of the detected temperature that is detected by the temperature sensor 52 (step S104). That is, while the on-off valve 50 is in the open state, the controller 42 controls the driving of the heat exchanger 51 and calculates the change amount ($\Delta t$) of the detected temperature while driving the heat exchanger 51.

The change amount ($\Delta t$) of the detected temperature is the change amount during the driving of the heat exchanger 51 from the temperature detected when the driving of the heat exchanger 51 started. For example, as illustrated in FIG. 4B, etc., the detected temperature of the temperature sensor 52 at the time tm1 at which the driving of the heat exchanger 51 started is TH0. The change amount ($\Delta t$) of the detected temperature is the absolute value of the difference between the latest detected temperature and the temperature (TH0) detected when the control of the driving of the heat exchanger 51 started.

The latest detected temperature is the latest detected temperature detected by the temperature sensor 52, i.e., the current detected temperature.

The controller 42 calculates the change amount ($\Delta t$) of the detected temperature within a maximum of the first period from when the driving of the heat exchanger 51 started in step S103.

The temperature (TH0) detected when the control of the driving of the heat exchanger 51 started is not limited strictly to the temperature detected simultaneously with the start of the drive control, and may be a temperature detected at about the start of the drive control as long as the temperature is detected at a timing that can be considered to be substantially the temperature when the drive control started. In the example, the detected temperature that is acquired in step S102 of FIG. 3 is used as the temperature (TH0) detected when the control of the driving of the heat exchanger 51 started. The temperature (TH0) detected when the control of the driving of the heat exchanger 51 started may be the detected temperature that is detected simultaneously with or immediately after the driving of the heat exchanger 51.

For example, when there is water or a flow of water inside the heat exchanger 51 and warm water is being generated by the heat exchanger 51, the detected temperature rises from the temperature when the driving of the heat exchanger 51 started. Also, for example, when there is a flow of water inside the heat exchanger 51, the temperature of the water flowing into the heat exchanger 51 (the incoming water temperature) is not always constant and may change (rise or drop) over time.

The detected temperature that is detected by the temperature sensor 52 downstream of the heat exchanger 51 is affected by the incoming water temperature and the heat applied by the heat exchanger 51. For example, when there is a flow of water inside the heat exchanger 51 and the incoming water temperature rises, the detected temperature may rise from the temperature when the driving of the heat exchanger 51 started. For example, when there is a flow of water inside the heat exchanger 51 and the incoming water temperature drops, the detected temperature may drop from the temperature when the driving of the heat exchanger 51 started.

Therefore, as illustrated in FIG. 3, in the case where the change amount ($\Delta t$) of the detected temperature reaches or exceeds a prescribed value (a first value) within a prescribed period (the first period) from when the control of the driving of the heat exchanger 51 started (step S104: Yes), the controller 42 determines that the driving of the heat exchanger 51 is allowable (step S105). In other words, the controller 42 does not prohibit the driving of the heat exchanger 51.

In the example, the first value is 1° C. In other words, in the example, when the detected temperature changes not less than ±1° C. from the time tm1, the controller 42 determines that the driving of the heat exchanger 51 is allowable.

For example, as in the example of FIG. 4B, there are cases where the detected temperature rises from the time tm1 at which the driving of the heat exchanger 51 started, and the change amount ($\Delta t$) of the detected temperature reaches or exceeds the first value at or before the time tm2, which is at the first period from the time tm1. In such a case, it is considered that warm water was generated by the driving of the heat exchanger 51, or there is a flow of water inside the heat exchanger 51 and the incoming water temperature increased. In other words, the presence of water or a flow of water inside the heat exchanger 51 can be detected.

For example, as in the example of FIG. 4C, there are cases where the detected temperature drops from the time tm1 at which the driving of the heat exchanger started, and the change amount ($\Delta t$) of the detected temperature reaches or exceeds the first value at or before the time tm2, which is at the first period from the time tm1. In such a case, it is considered that there is a flow of water inside the heat exchanger 51, and the incoming water temperature dropped. In other words, the presence of water or a flow of water inside the heat exchanger 51 can be detected.

The first value is a positive value and is, for example, not less than 0.5° C. and not more than 30° C. The first period is, for example, not less than 0.5 seconds and not more than 20 seconds. In the example, the first period is 3 seconds, and the determination control detects the presence of a flow of water inside the heat exchanger 51. By lengthening the first period, for example, the presence of water inside the heat exchanger 51 can be detected. The first period and the first value are not limited to those described above; it is sufficient to appropriately determine the first period and the first value so that the presence of water or a flow of water inside the heat exchanger 51 can be detected.

In the case where the change amount ($\Delta t$) reaches or exceeds the first value within the first period from the time tm1, the controller 42 may end the determination control even before the first period has elapsed from the time tm1. In the case where the driving of the heat exchanger 51 is determined to be allowable (step S105), the controller 42 may continue the on-state of the heat exchanger 51 even after the change amount ($\Delta t$) reaches or exceeds the first value (e.g., after the time tm2).

For example, when there is no water or flow of water conducting the heat inside the heat exchanger 51, the change amount ($\Delta t$) of the detected temperature does not reach or exceed the first value within the first period. Or, there is a possibility that the change amount ($\Delta t$) of the detected temperature may not reach or exceed the first value within the first period when water is flowing into the heat exchanger 51 but the incoming water temperature is decreasing. In other words, a case may occur where the change of the temperature detected by the temperature sensor downstream is small even though heat is applied by the heat exchanger 51 because the increase amount of the temperature due to the heat of the heat exchanger 51 and the decrease amount of the incoming water temperature are close to each other. For example, a case may occur where the temperature rise due to the heat exchanger 51 and the decrease of the incoming water temperature are balanced.

Thus, when the change amount ($\Delta t$) does not reach or exceed the first value within the first period from the time tm1, the case where there is no water or flow of water inside the heat exchanger 51 and the case where the temperature of the water flowing into the heat exchanger is decreasing are assumed. In particular, it is difficult to detect the decrease of the incoming water temperature when an incoming water temperature sensor is not included.

Therefore, for example, the controller 42 performs steps S106 to S108 illustrated in FIG. 3. In other words, in the case where the change amount ($\Delta$t) of the detected temperature does not reach or exceed the first value within the first period from when the control of the driving of the heat exchanger 51 started (step S104: No), the controller 42 acquires the detected temperature that is detected by the temperature sensor 52 (step S106).

Then, the controller 42 performs a drive stop control of stopping the driving of the heat exchanger 51 (step S107). In other words, the controller 42 switches the on-state in which the drive power for heat generation is supplied to the heat exchanger 51 to the off-state in which the supply of the drive power is stopped.

For example, as illustrated in FIG. 4D or FIG. 4E, in the case where the change amount ($\Delta$t) of the detected temperature is less than the first value from the time tm1 to the time tm2, the controller 42 switches the heat exchanger 51 from the on-state to the off-state at the time tm2.

As illustrated in FIG. 3, after step S107, the controller 42 calculates the drop amount of the temperature detected by the temperature sensor 52. That is, the controller 42 performs a control of stopping the driving of the heat exchanger 51 and calculates the drop amount ($\Delta$toff) of the detected temperature while the driving of the heat exchanger 51 is stopped.

The drop amount ($\Delta$toff) of the detected temperature is the drop amount in the off-state of the heat exchanger 51 from the temperature when the driving of the heat exchanger 51 stopped. For example, as illustrated in FIG. 4D, etc., the detected temperature of the temperature sensor 52 at the time tm2 at which the driving of the heat exchanger stopped is TH1. The drop amount ($\Delta$toff) of the detected temperature is the absolute value of the difference between the latest detected temperature and the temperature (TH1) detected when the control of stopping the driving of the heat exchanger 51 is performed in the case where the latest detected temperature is less than the temperature (TH1) detected when the control of stopping the driving of the heat exchanger 51 is performed.

For example, the controller 42 calculates the drop amount ($\Delta$toff) of the detected temperature within a maximum of a second period from when the driving of the heat exchanger 51 stopped in step S107.

The temperature (TH1) detected when the control of stopping the driving of the heat exchanger 51 is performed is not limited strictly to the temperature detected simultaneously with the drive stop, and may be a temperature detected at about the drive stop control as long as the temperature is detected at a timing that can be considered to be substantially the timing at which the drive stop control of the heat exchanger 51 was performed. In the example, the temperature (TH1) detected when the control of stopping the driving of the heat exchanger 51 is performed is used as the detected temperature that is acquired in step S106 of FIG. 3. The temperature (TH1) detected when the control of stopping the driving of the heat exchanger 51 is performed may be a temperature detected simultaneously with or immediately after the drive stop of the heat exchanger 51.

For example, when there is a flow of water inside the heat exchanger 51 and the incoming water temperature is decreasing, the detected temperature drops from the temperature (TH1) when the driving of the heat exchanger 51 stopped.

Therefore, as illustrated in FIG. 3, in the case where the drop amount ($\Delta$toff) of the detected temperature reaches or exceeds a prescribed value (a second value) within a prescribed period (the second period) from when the control of stopping the driving of the heat exchanger 51 was performed (step S108: Yes), the controller 42 determines that the driving of the heat exchanger 51 is allowable (step S105). In such a case, the controller 42 may re-start the driving of the heat exchanger 51. In the example, the second value is 1° C. In other words, in the example, in the case where the detected temperature decreases not less than 1° C. from the time tm2, the controller 42 determines that the driving of the heat exchanger 51 is allowable. For example, as in the example of FIG. 4D, there are cases where the detected temperature decreases from the time tm2 at which the driving of the heat exchanger 51 stopped, and the drop amount ($\Delta$toff) of the detected temperature reaches or exceeds the second value at or before a time tm3 that is the second period after the time tm2. In such a case, it is considered that there is a flow of water inside the heat exchanger 51, and the incoming water temperature decreased. In other words, the presence of a flow of water inside the heat exchanger 51 can be detected.

On the other hand, when there is no water or flow of water inside the heat exchanger 51, the detected temperature does not drop from the temperature (TH1) when the driving of the heat exchanger 51 stopped, or the drop amount is small. As illustrated in FIG. 3, in the case where the drop amount ($\Delta$toff) of the detected temperature does not reach or exceed the second value within the second period from when the control of stopping the driving of the heat exchanger 51 was performed (step S108: No), the controller 42 prohibits the driving of the heat exchanger 51. In other words, for example, even if the user inputs, to the operation unit 44, the warm-water wash operation to cause warm water to be discharged from the nozzle, the controller 42 does not drive the heat exchanger 51.

For example, as in the example of FIG. 4E, there are cases where the detected temperature does not drop from the time tm2 at which the driving of the heat exchanger 51 stopped, and the drop amount ($\Delta$toff) of the detected temperature does not reach or exceed the second value at or before the time tm3, which is the second period after the time tm2. In such a case, it is considered that there is no water or flow of water inside the heat exchanger 51. In other words, the absence of water or a flow of water inside the heat exchanger 51 can be detected. For example, when there is no water inside the heat exchanger 51, there is a possibility that the detected temperature of the temperature sensor may rise as in FIG. 4E due to natural convection of air after the driving of the heat exchanger 51 stopped. Therefore, in step S108, the controller 42 determines the drop amount instead of the change amount of the detected temperature.

Thus, by calculating the drop amount of the detected temperature while the driving of the heat exchanger 51 is stopped, the driving of the heat exchanger 51 can be determined to be allowable in the case where the temperature of the water flowing into the heat exchanger 51 is decreasing.

The second value is a positive value and is, for example, not less than 0.5° C. and not more than 30° C. The second period is, for example, not less than 0.5 seconds and not more than 20 seconds. In the example, the second period is 3 seconds. The second period and the second value are not limited to those described above; and it is sufficient to appropriately determine the second period and the second value so that the presence of water or a flow of water inside the heat exchanger 51 can be detected.

In the case where the drop amount (Δtoff) reaches or exceeds the second value within the second period from the time tm2, the controller 42 may end the determination control even before the second period has elapsed from the time tm2. Also, in the case where the driving of the heat exchanger 51 is determined to be allowable (step S105), the controller 42 may re-start the driving of the heat exchanger 51 after the drop amount (Δtoff) reaches or exceeds the second value (e.g., before or after the time tm3).

For example, when the heat exchanger is driven in a state in which there is no water or flow of water inside the heat exchanger, there is a risk that excessive heating may occur. For example, even when the on-off valve is open, there is a possibility that water may not flow into the heat exchanger due to a discrepancy. For example, there is a risk that empty-heating may occur if the heat exchanger is driven in a state in which water does not flow into the heat exchanger.

In contrast, according to the embodiment, the heat exchanger 51 can be driven more appropriately based on the detected temperature of the temperature sensor 52 disposed downstream of the heat exchanger 51. For example, in the case where there is water or a flow of water inside the heat exchanger 51, the driving of the heat exchanger 51 can be determined to be allowable. In the case where there is no water or flow of water inside the heat exchanger 51, the driving of the heat exchanger 51 can be determined not to be allowable, and subsequent driving of the heat exchanger 51 can be suppressed. Excessive heating of the heat exchanger 51 can be suppressed thereby. For example, the discharge of high-temperature wash water in the warm-water wash operation can be suppressed.

For example, in a conventional toilet device, there are cases where a flow rate sensor and/or an incoming water temperature sensor are included. The flow rate sensor detects the flow rate of the water flowing through the heat exchanger. The incoming water temperature sensor is disposed upstream of the heat exchanger and detects the temperature of the water flowing into the heat exchanger. For example, in such a conventional toilet device, the presence of the flow of water inside the heat exchanger is detected based on the detection result of the flow rate sensor.

In contrast, in the toilet device according to the embodiment, the enablement of the driving of the heat exchanger 51 can be determined according to the presence of water or a flow of water inside the heat exchanger 51 without using a flow rate sensor or an incoming water temperature sensor. Because a flow rate sensor and/or an incoming water temperature sensor may not be included, the manufacturing cost can be reduced. For example, an inexpensive toilet device can be provided.

Also, in the determination control, in the case where the change amount (Δt) of the detected temperature does not reach or exceed the first value within the first period due to the decrease of the incoming water temperature, there are cases where the drop amount (Δtoff) of the detected temperature may reach or exceed the first value while the driving of the heat exchanger 51 is stopped.

For example, the second value may be the first value or less. As a result, in the case where the change amount of the detected temperature does not reach or exceed the first value within the first period during the determination control, it is easier to detect the decrease of the temperature of the water flowing into the heat exchanger. For example, the accuracy of the determination is increased.

The output of the heat exchanger 51 during the determination control may be less than the output of the heat exchanger 51 during the normal operation (e.g., the warm-water wash operation). For example, as described above, the controller is configured to perform the warm-water wash control of driving the heat exchanger 51 with the first output (e.g., 1,200 watts) and causing the nozzle 34 to discharge, toward a private part of the user, the water warmed by the heat exchanger 51. In the determination control, the controller 42 drives the heat exchanger 51 with the second output (e.g., 100 watts) that is less than the first output. By reducing the output of the heat exchanger 51 during the determination control, even if there is no water inside the heat exchanger 51, damage of the heat exchanger 51 due to empty-heating during the determination control can be suppressed.

In the determination control as described above, in the case of "No" in step S108, it is considered that there is no water or flow of water inside the heat exchanger 51. In such a case, even if the driving of the heat exchanger 51 is stopped, there are cases where the user would not realize that a discrepancy in the supply of the water had occurred.

Therefore, in the determination control, in the case where the drop amount (Δtoff) does not reach or exceed the second value within the second period from when the driving of the heat exchanger 51 stopped (step S108: No), if the user inputs a wash operation to cause the nozzle 34 to discharge water, the controller 42 drives the nozzle. For example, the nozzle 34 is caused to advance and retreat with respect to the bowl 4a. Thus, even when the driving of the heat exchanger 51 is stopped, by driving the nozzle 34, the user can be notified that a problem has occurred in the supply of the water due to some cause.

For example, the determination control described with reference to FIG. 3 is performed when the user is seated on the toilet seat. As a result, the heat exchanger 51 can be appropriately driven when the warm-water wash operation is input to the operation unit 44 after the user is seated. For example, empty-heating can be suppressed.

For example, the controller 42 starts the determination control when the seating detection sensor 31 detects the seating of the user. The controller 42 controls the flow regulation/flow channel switch valve 55 to set the heat exchanger 51 and the water discharge hole of the nozzle 34 to be able to pass water during the determination control. As a result, when there is a flow of water inside the heat exchanger 51 during the determination control, the water that is discharged from the heat exchanger 51 is discharged from the nozzle 34. That is, the determination control and the water dump of the warm water preparation can be simultaneously performed in parallel.

It also may be considered to perform the determination control when performing the warm-water wash operation.

However, in such a case, if the driving of the heat exchanger is stopped or the output of the heat exchanger is low while performing the determination control, there is a possibility that the water may not be sufficiently warmed while performing the determination control. Therefore, if the water is discharged toward the user while performing the determination control, there is a possibility that water that is not warmed may be undesirably discharged toward the user. It also may be considered to perform the determination control and the water dump in parallel in the warm-water wash operation directly before discharging water toward the user; however, in such a case, the timing of discharging the water toward the user is undesirably delayed.

In contrast, according to the embodiment as described above, in the case where there is a flow of water inside the heat exchanger during the determination control, the determination control and the water dump can be performed in parallel when the user is seated. As a result, for example, water can be discharged from the nozzle immediately in the warm-water wash operation, and the ease of use can be further improved. However, according to the embodiment, the determination control may be performed before or after the warm water preparation (the water dump).

The embodiments may include the following configurations.

Configuration 1

A toilet device, comprising:

a heat exchanger, the heat exchanger being an instantaneous type;

an on-off valve configured to open and close a flow channel of water flowing in the heat exchanger;

a temperature sensor disposed downstream of the heat exchanger; and a controller configured to acquire a detected temperature that is detected by the temperature sensor, and control the heat exchanger, the controller being configured to perform a determination control of driving the heat exchanger in a state in which the on-off valve is open, and calculating a change amount of the detected temperature while driving the heat exchanger, stopping the driving of the heat exchanger in the case where the change amount does not reach or exceed a first value within a first period from when the driving of the heat exchanger started, and calculating a drop amount of the detected temperature while the driving of the heat exchanger is stopped, and determining the driving of the heat exchanger to be allowable in the case where the drop amount reaches or exceeds a second value within a second period from when the driving of the heat exchanger stopped.

Configuration 2

The device according to Configuration 1, wherein the second value is not more than the first value.

Configuration 3

The device according to Configuration 1 or 2, further comprising:

a toilet seat;

a seating detection sensor configured to detect a seating of a user on the toilet seat; and a nozzle configured to discharge water discharged from the heat exchanger, the controller starting the determination control and setting the nozzle and the heat exchanger to be able to pass water in the case where the seating of the user is detected by the seating detection sensor.

Configuration 4

The device according to any one of Configurations 1 to 3, further comprising:

a nozzle configured to discharge water discharged from the heat exchanger, in the case where the drop amount does not reach or exceed the second value within the second period from when the driving of the heat exchanger stopped in the determination control, the controller driving the nozzle when receiving an instruction to cause the nozzle to discharge water.

Configuration 5

The device according to any one of Configurations 1 to 4, further comprising:

a nozzle configured to discharge water discharged from the heat exchanger, the controller being configured to perform a warm-water wash control of causing the nozzle to discharge, toward a private part of a user, water warmed by the heat exchanger by driving the heat exchanger with a first output, in the determination control, the controller driving the heat exchanger with a second output, the second output being less than the first output.

The invention has been described with reference to the embodiments. However, the invention is not limited to these embodiments. Any design changes in the above embodiments suitably made by those skilled in the art are also encompassed within the scope of the invention as long as they fall within the spirit of the invention. For example, the shape, the size the material, the disposition and the arrangement or the like of the components are not limited to illustrations and can be changed appropriately.

The components included in the embodiments described above can be combined to the extent possible, and these combinations are also encompassed within the scope of the invention as long as they include the features of the invention.

What is claimed is:

1. A toilet device, comprising:

a heat exchanger, the heat exchanger being an instantaneous type;

an on-off valve configured to open and close a flow channel of water flowing in the heat exchanger;

a temperature sensor disposed downstream of the heat exchanger; and a controller configured to acquire a detected temperature that is detected by the temperature sensor, and control the heat exchanger, the controller being configured to perform a determination control of driving the heat exchanger in a state in which the on-off valve is open, and calculating a change amount of the detected temperature while driving the heat exchanger, stopping the driving of the heat exchanger in the case where the change amount does not reach or exceed a first value within a first period from when the driving of the heat exchanger started, and calculating a drop amount of the detected temperature while the driving of the heat exchanger is stopped, and determining the driving of the heat exchanger to be allowable in the case where the drop amount reaches or exceeds a second value within a second period from when the driving of the heat exchanger stopped.

2. The device according to claim 1, wherein the second value is not more than the first value.

3. The device according to claim 1, further comprising:

a toilet seat;

a seating detection sensor configured to detect a seating of a user on the toilet seat; and a nozzle configured to discharge water discharged from the heat exchanger, the controller starting the determination control and setting the nozzle and the heat exchanger to be able to pass water in the case where the seating of the user is detected by the seating detection sensor.

4. The device according to claim 1, further comprising:

a nozzle configured to discharge water discharged from the heat exchanger, in the case where the drop amount does not reach or exceed the second value within the second period from when the driving of the heat exchanger stopped in the determination control, the controller driving the nozzle when receiving an instruction to cause the nozzle to discharge water.

5. The device according to claim 1, further comprising:

a nozzle configured to discharge water discharged from the heat exchanger, the controller being configured to perform a warm-water wash control of causing the nozzle to discharge, toward a private part of a user, water warmed by the heat exchanger by driving the heat exchanger with a first output, in the determination control, the controller driving the heat exchanger with a second output, the second output being less than the first output.

* * * * *